Feb. 22, 1966   W. R. HNOT   3,236,680
PROCESS AND APPARATUS FOR COATING AND IMPREGNATING
Filed Oct. 19, 1962   3 Sheets-Sheet 1
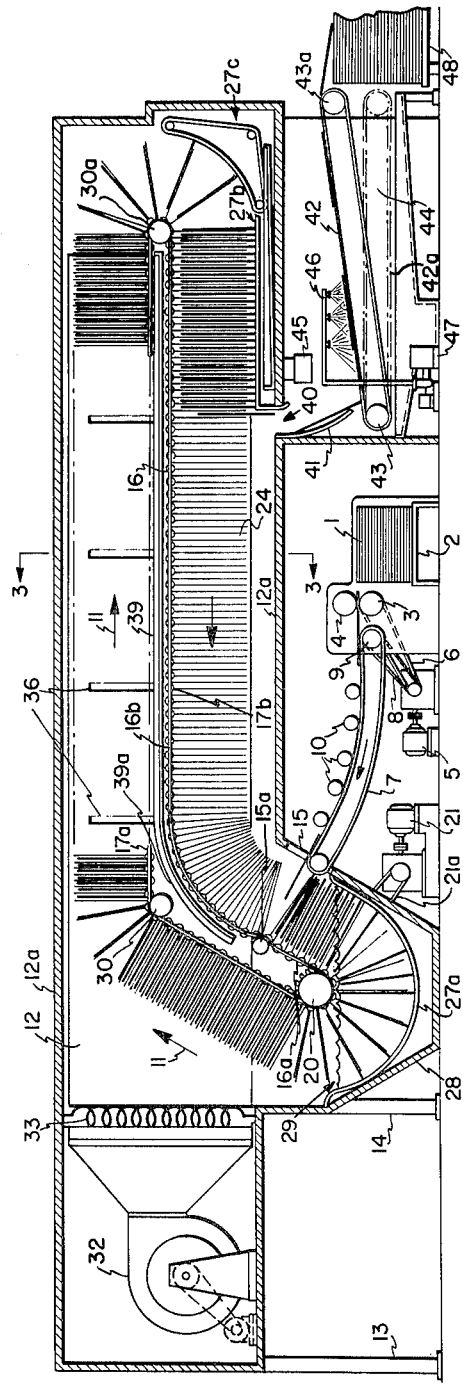
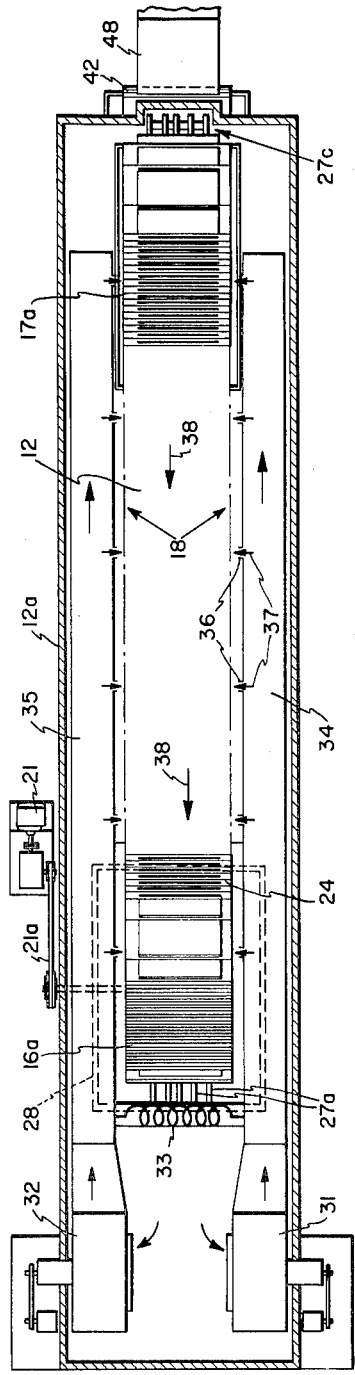
Walter R. Hnot   Inventor
By Frank T. Johnson
Patent Attorney Feb. 22, 1966   W. R. HNOT   3,236,680
PROCESS AND APPARATUS FOR COATING AND IMPREGNATING
Filed Oct. 19, 1962   3 Sheets-Sheet 2

Walter R. Hnot   Inventor
By Frank T. Johnmann
Patent Attorney

Feb. 22, 1966   W. R. HNOT   3,236,680
PROCESS AND APPARATUS FOR COATING AND IMPREGNATING
Filed Oct. 19, 1962   3 Sheets-Sheet 3

Walter R. Hnot   Inventor
By Frank T. Johmann
Patent Attorney

United States Patent Office 3,236,680
Patented Feb. 22, 1966

3,236,680
PROCESS AND APPARATUS FOR COATING
AND IMPREGNATING
Walter R. Hnot, Mountainside, N.J., assignor to Esso Research and Engineering Company, a corporation of Delaware
Filed Oct. 19, 1962, Ser. No. 231,683
6 Claims. (Cl. 117—95)

This invention relates to a process and apparatus for coating and/or impregnating articles. Particularly, the invention relates to a process and apparatus for impregnating flat, sheet-like fibrous materials with wax compositions. In its preferred form, the invention relates to a continuous impregnating process and apparatus which are especially suitable for impregnating corrugated fiberboard with wax compositions.

An important use for wax compositions is in the impregnation of corrugated fiberboard. Such impregnation has been found to be especially desirable for those applications wherein the fiberboard is exposed to long and continuous exposure to moisture or water. Thus, for example, wax-impregnated corrugated fiberboards, e.g. cardboard cartons, because of their lighter weight and greater ease of handling, are preferred to the conventional wooden crates for use in shipping wet packed foods, such as poultry packed in ice. Another common application for such cartons is in the hydro-cooling of fruits and vegetables where the filled cartons are conveyed through or immersed in refrigerated water in order to wash, cool and dampen the contents.

Under such severe moisture conditions, the fiberboards usually should be completely saturated with the wax composition in order to effectively resist water absorption and consequent failure of the board. Moreover, corrugated fiberboard is multiwalled and in its simplest form comprises three walls; two outside walls called liners, and an inner fluted sheet called the medium. Thus, the corrugated fiberboards are subjected to water on all sides as well as in the open spacings formed by the flutes between the medium and the liners. The requirements for wax-impregnated corrugated fiberboard containers differ, therefore, from those of conventional surface-coated containers such as milk cartons, where the only requirement is that a continuous surface film be formed. For the uses discussed above, a mere surface coating on a corrugated fiberboard container is usually ineffective since impregnation is required deep into the fibers of each separate construction piece of the fiberboard, i.e. into both the liners and the medium.

Conventional methods of impregnating corrugated fiberboards involve simple batchwise dipping of the boards with the flutes upright, into the molten wax composition and subsequent draining of excess wax. Such batchwise procedures are usually time consuming and costly from a labor standpoint, as well as being limited in capacity by the size of the dipping tank and the required draining period. Moreover, the conventional draining procedure is generally accomplished by simply hanging the wet boards vertically in an oven at a desired temperature for a prescribed period of time. During this draining period, excess wax normally accumulates at the bottom of the board within the open flutes by capillary action, which excess wax is undesirable from both a quality and economic standpoint.

One aspect of the present invention is to provide a process and apparatus for continuously coating and impregnating corrugated fiberboards with a wax composition, thereby reducing processing costs and increasing production rates. Another aspect of the invention is to provide a compact apparatus for continuously wax impregnating, draining and heat-curing said corrugated fiberboards in an economical manner, whereby operating costs may be minimized by optimum utilization of heat and space. A still further aspect of the invention is to provide for a uniform and even distribution and penetration of wax composition throughout the corrugated fiberboards in order to generally provide improved quality and appearance. Additionally, the excess accumulation and inherent waste of wax composition at the bottom of the boards is eliminated. Other aspects of the invention will become readily apparent as the following description proceeds.

Generally, the invention comprises means for successively and continuously conveying flat sheet-like articles, e.g. corrugated fiberboards, through various operating zones which include: a liquid immersion zone; a heating zone substantially enclosing the conveying means, through which hot air is circulated at a prescribed temperature; a cooling zone; and an optional water fog spray zone which may be used for cooling as well as for the addition of moisture to the articles. The addition of moisture will normally be preferable because of its beneficial effect in improving the flexural properties of impregnated fiberboards, thereby alleviating the tendency of the boards to crack when folded into cartons.

The invention preferably provides an endless conveyor, which may conveniently comprise a chain and sprocket wheel mechanism; a plurality of closely spaced rectangular leaves or wickets attached essentially perpendicularly to said conveyor; and a heat-curing oven enclosing said conveyor. Corrugated fiberboards are continuously and successively fed between adjacent wickets at a loading station. The conveyor then continuously transports the boards by means of the attached wickets, to a molten wax composition bath which is positioned under an open portion of the heat-curing oven; passes the boards through an essentially fully immersed and at least momentarily vertical position in the bath to thereby ensure a full displacement of air and a complete flooding and penetration of wax composition into the interior fluted portions of the boards; transports the boards from the bath to the heat-curing oven; rotates the boards, in stages, through a sufficient angle, e.g. about 360°, from the vertical position in the bath to facilitate proper drainage of excess wax composition, to provide an even distribution of the wax composition within the boards and to eliminate excess accumulation of the wax composition at the bottom of the boards; and finally drops the boards to an auxiliary cooling chamber external to the heat-curing oven where an auxiliary conveyor transports the boards through cooling air and a water spray to an unloading station.

The apparatus permits an optimum utilization of space and heat since a high proportion of the wickets can be utilized with the only empty wickets being located in a relatively short portion of the conveyor located between the loading and unloading stations. Furthermore, the wickets need never pass through the cooling chamber, but can be maintained at the elevated temperature of the oven. A maximum utilization of heat is thereby possible, as opposed to a system wherein the wickets would be alternately heated and cooled. Additionally, the rotation of the boards in the heat-curing oven during the draining and heating periods ensures a maximum penetration with a minimum consumption of wax composition, thereby economically providing impregnated boards of improved quality and appearance.

As indicated, a complete flooding of the interior fluted portion of the corrugated fiberboards with wax composition is usually very desirable. The particular feature of the present invention which ensures such flooding is the vertical movement of the board through the wax composition bath. By means of such vertical movement the entrapped air within the flutes of the board is easily displaced by the natural rising of the liquid wax composition through the corrugations of the board. Other types of movement through the wax composition bath without the vertical positioning would not generally be satisfactory without additional factors coming into play. Thus, as previously mentioned, a distinction should be made between coating and impregnation. While certain conventional wax coating procedures have utilized a horizontal passage of flat boards or paper through molten wax, such procedures would be generally unsatisfactory for achieving the impregnation of corrugated fiberboard. A horizontal passage of a corrugated fiberboard would succeed in coating only the exterior surface of the board and would not generally be satisfactory for impregnation, since the entrapped air within the flutes of the board, having no escape route, would prevent the entry of the molten wax into the interior fluted portions of the board. The net result would be a board having a coated exterior and an essentially wax-free interior, which would be unsatisfactory for many of the purposes hereinbefore described.

The invention will be further understood by reference to the following description and accompanying drawings which include a preferred embodiment of the invention.

FIGURE 1 is a side elevation, partly in section, of the apparatus, illustrating the insertion of a fiberboard between two adjacent wickets, a heat-curing oven, an immersion tank, the upper and lower flights of a conveyor, and the unloading of the finished boards to the external cooling zones. Although, in practice, the wickets are actually attached over the entire length of the conveyor, they are only shown over certain portions of the conveyor for purposes of simplicity.

FIGURE 2 is a plan view of the apparatus, illustrating the flow pattern of the hot recirculated air originating from two blowers.

Figure 3:
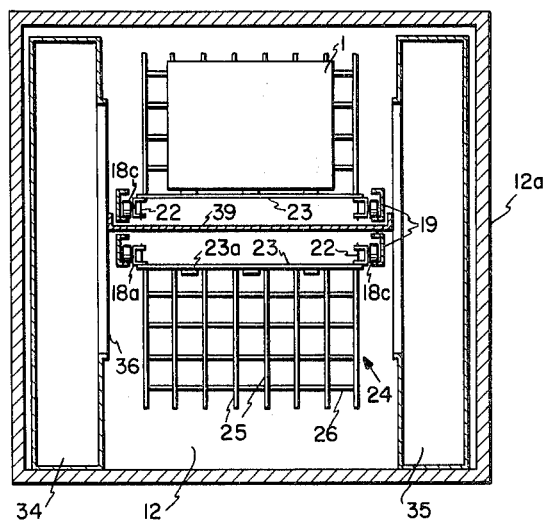
FIGURE 3 is a vertical sectional view taken on the line 3—3 of FIGURE 1, illustrating a lower wicket and an upper wicket together with an inserted fiberboard; and the flow pattern of the hot, recirculated air as indicated by the arrows in FIGURE 3.

Referring now more specifically to the accompanying drawings, wherein like numerals will be used to indicate corresponding parts throughout, FIGURES 1, 2 and 3 illustrate the method and apparatus for continuously impregnating corrugated fiberboards.

Flat corrugated fiberboards 1, stacked at a loading platform 2, are continuously fed to driven rubber coated rollers 3 and 4. Roller 3 is driven by motor 5 by means of chain 6. Roller 4 is driven by similar conventional means. The fiberboards 1 may be to rollers 3 and 4, either manually or by any conventional automatic feeding mechanism. Inlet conveyor belt 7, driven by means of motor 5, chain 8, and roller 9, receives the fiberboards 1 from rollers 3 and 4, and transports them as indicated. Idlers 10 serve to prevent slippage of the fiberboards 1 as they are being transported by inlet conveyor belt 7.

Figures 5, 6:
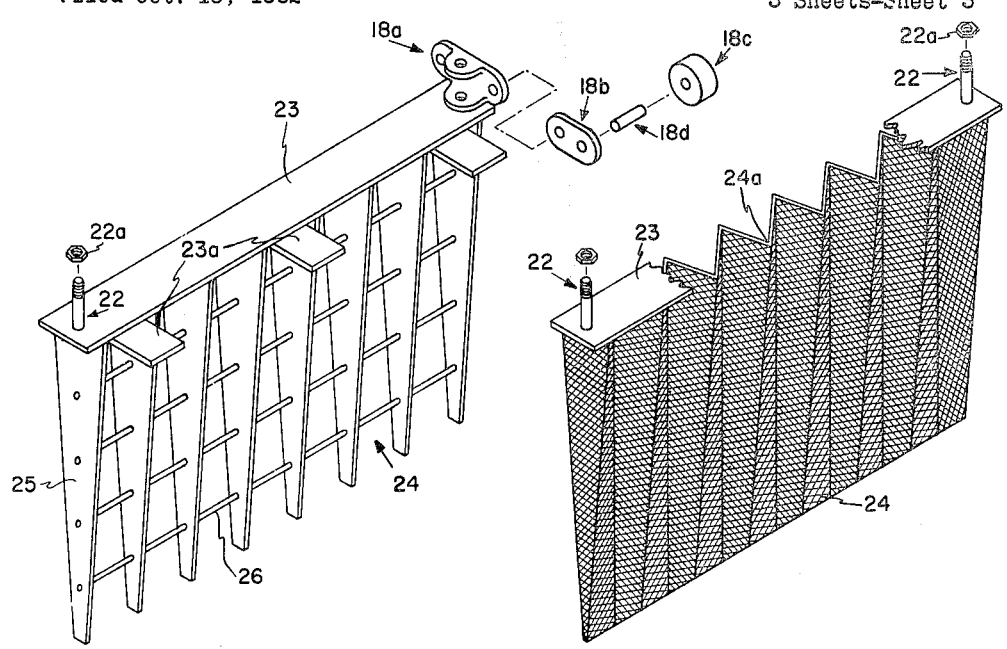
FIGURE 5 is an enlarged perspective view of a wicket and its attachment at one end to a chain conveyor.
FIGURE 6 is an enlarged, perspective view of an alternative form of wicket composed of a metal mesh material.
Figure 7:
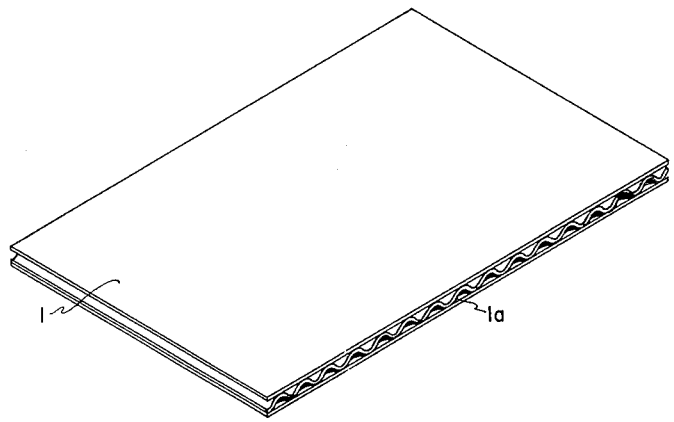
FIGURE 7 is a perspective view of a corrugated fiberboard.

The course of travel of the boards throughout the apparatus is indicated by the arrows 11 in FIGURE 1. An oven 12, formed by enclosure 12a, and partially supported by members 13 and 14, has an opening 15 proximate the outlet end of the conveyor belt 7. Within the enclosure 12a is an endless conveyor indicated generally at 16, having an inclined portion 16a, a horizontal portion 16b, an upper flight 17a, and a lower flight 17b, and comprising a pair of laterally spaced chains 18 (FIGURE 2). The conveyor chains 18 are propelled by a pair of sprocket wheels 20, which sprocket wheels are journaled in the enclosure 12a. Sprocket wheels 20 are driven by motor 21 and chain 21a. The conveyor chains 18 comprise bent attachment links 18a, plain links 18b, rollers 18c, and connecting pins 18d (FIGURE 5). The desired travel of the conveyor chains 18 is governed by a guide track 19 (FIGURE 3) which serves to guide the rollers 18c. For purposes of clarity, the track 19 is not shown in FIGURE 1. In actuality, the track 19 is substantially continuous, being interrupted only at the various sprockets and rollers shown in FIGURE 1. Fixed to the links 18a, by means of a welded and threaded bolt 22, and nut 22a (FIGURES 3, 5, and 6), are parallel, laterally extending bars 23. The bottom sides of the bars 23 are, in turn, fixed at right angles to rectangularly-shaped wickets 24.

FIGURE 5 illustrates the construction of a wicket 24. Fixed to bar 23 is a plurality of tapered members 25, which are joined together by crossbars 26, to thereby form a form of grill or grate. Also fixed to the bottom sides of bars 23 is a plurality of ears 23a, which ears extend outwardly parallel to the plane of bars 23. The function of ears 23a will become apparent as the description proceeds.

FIGURE 6 illustrates an alternative form of a wicket 24, which is characterized by a minimum board-contacting surface area, having tapered folds 24a and consisting of a rigid, flattened expanded metal material.

The bars 23 are preferably positioned in close evenly spaced relationship throughout the entire length of the conveyor 16. There is thus formed a network or series of closely spaced wickets 24, which are attached at substantially right angles to the chairs 18 regardless of their instantaneous position along the travel of the conveyor 16.

Supported within the enclosure 12a, are fixed guide members 27a and 27b, consisting of a plurality of closely spaced and essentially continuous rails (FIGURE 2) which are fixed at a parallel, spaced relationship to the conveyor chains 18. The spaced relationship will, of course, be sufficient to allow a clearance between the wickets 24, and the guide members 27a and 27b, so that the wickets 24 will have free unobstructed movement. As shown in FIGURE 1, the guide members 27a and 27b are positioned where necessary to provide bottom support for the fiberboards 1; i.e. when the latter are in position between adjacent wickets 24 and when said wickets 24 extend downwardly from the chains 18. In addition to guide member 27b, a "helper" conveyor 27c, consisting of five chains moving on a curved track (not shown), and at a linear speed equal to that of the tip of the wickets 24, carries the tips of the fiberboards 1 (thereby preventing dragging) around to guide member 27b. This "helper" conveyor 27c is driven by conventional means.

When the wickets 24 extend upwardly from the chains 18 on the upper flight 17a of the conveyor 16, support for the fiberboards 1 is provided by ears 23a, which are attached to bars 23 (FIGURE 5) as previously described. The length of the ears 23a will depend upon the spacing between adjacent bars 23 and should be sufficient to prevent the fiberboards 1 from dropping from between two adjacent wickets 24 when said wickets are in their upwardly extending position. As indicated in FIGURE 5, each of the ears 23a is attached at but one end to a single bar 23, as opposed to being attached at both ends to two adjacent bars 23. In this manner, the rotation of the bars 23, and the attached wickets 24, during their course of travel is unobstructed by ears 23a.

Returning to FIGURE 1, an immersion tank 28 is disposed proximate the lower end of the inclined portion 16a of conveyor 16, and is merely a lower extension of enclosure 12a. The immersion tank 28 contains molten wax composition 29, which is maintained at a desired temperature by means of steam coils (not shown). Sprocket wheels 20 are situated at the lower end of the inclined portion 16a of conveyor 16 proximate the surface of the molten wax composition 29. Rollers 30 are situated at the upper end of the inclined portion 16a of conveyor 16, and therefore substantially higher than sprockets 20, so that the travel of the conveyor 16 will be reversed sharply as said conveyor passes around sprockets 20. As will be seen in FIGURE 1, the guide member 27a also passes into the immersion tank 28 maintaining at all times its fixed parallel spaced relationship to the conveyor 16.

The enclosure 12a substantially surrounds the conveyor 16, thereby forming a heat-curing oven 12, through which hot air is circulated in the manner now to be described.

As illustrated in FIGURE 2, a pair of blowers 31 and 32, and steam coils 33, are located at one end of the oven 12. Side ducts 34 and 35 extend longitudinally across the length of the oven 12. Thus, as shown in FIGURE 2, the oven 12 encloses conveyor 16 and is bounded on its sides by side ducts 34 and 35. Side ducts 34 and 35 contain a plurality of vertical slots 36, which direct the incoming air towards the conveyor 16. Each of the blowers 31 and 32 is positioned with its outlet at the entrance of each of the side ducts 34 and 35. Thus, air is directed into side ducts 34 and 35, and subsequently through slots 36, as indicated by the arrows 37 in FIGURE 2. The direction of the air is then reversed, as indicated by arrows 38 in FIGURE 2, and returns toward the blowers 31 and 32, in the space between the upper flight 17a and lower flight 17b of conveyor 16, where it passes in heat exchange relationship with steam coils 33, and thence to the inlets of the blowers 31 and 32 to be recirculated. In this manner, heated air is continuously recirculated through oven 12, at the desired temperature, as determined by the temperature of steam coils 33.

Figure 4:
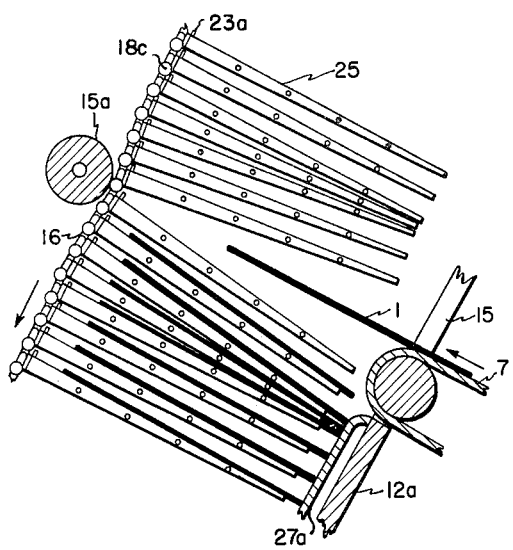
FIGURE 4 is an enlarged, side view of a portion of the chain conveyor illustrating a plurality of wickets at the loading point as a fiberboard is being inserted between two adjacent wickets.

Returning to FIGURE 1, it will be observed that opening 15, in enclosure 12a, is located proximate inlet conveyor belt 7, to provide an inlet for the untreated fiberboards 1. Located directly opposite opening 15, are rollers 15a which slightly interrupt the smooth travel of the conveyor chains 18, thereby causing the wickets 24 to slightly separate as they pass around rollers 15a. In this fashion, the insertion of the fiberboards between successive wickets is facilitated, as illustrated in FIGURE 4.

Located between the upper flight 17a and lower flight 17b of the conveyor 16 is an inclined drip tray 39 supported by conventional means (not shown) and having its lower end 39a disposed above the immersion tank 28.

An outlet for the treated fiberboards is provided by opening 40 in enclosure 12a, through which the treated boards drop by the force of gravity. Outlet guide member 41 directs the boards to outlet conveyor belt 42, which is driven by roller 43 by conventional means. As shown by the dotted lines 42a, the outlet conveyor belt 42 is pivoted at roller 43 and adjustable in height at roller 43a to facilitate unloading.

The external cooling zone is designated generally at 44. Cooling is effected by cooling exhaust duct 45, located proximate outlet conveyor belt 42, which continuously draws in surrounding air by means of an exhaust fan (not shown). Additionally, cooling water spray 46, as shown in FIGURE 1, supplied by cooling water pump 47, from a reservoir (not shown), directs a fine mist or fog over the fiberboards.

Finally, positioned at the end of outlet conveyor belt 42, i.e. at roller 43a, is unloading station 48, which receives the finished fiberboards.

The operation of the apparatus will now be more fully described by following the course of the fiberboards 1, throughout one complete cycle from the loading platform 2, to the unloading station 48.

The fiberboards 1 are loaded at the loading platform 2, with an open end of their flutes 1a, facing the inlet conveyor belt 7. Rollers 3 and 4, and inlet conveyor belt 7, transport successive fiberboards from the loading platform 2, through opening 15 of enclosure 12a. The fiberboards 1 are inserted between two adjacent wickets 24, which wickets have separated due to the action of rollers 15a as hereinbefore described. The inserted fiberboards 1 are subsequently carried by the wickets 24, with their open flutes 1a aligned in a direction perpendicular to the conveyor chains 18, in accordance with the designed travel of the conveyor. The boards 1 are prevented from dropping from between wickets 24 by guide members 27a and 27b, "helper" conveyor 27c, and ears 23a as hereinbefore described.

Referring to FIGURE 1, as the conveyor 16 nears sprocket wheels 20, the wickets 24 and the contained fiberboards 1 enter the immersion tank 28 and the molten wax composition 29 at about a 45° angle with the horizontal. As the conveyor 16 travels around sprocket wheels 20, the wickets 24 and boards 1 are rotated through the molten wax composition 29 from the original 45° angle, through a vertical position in the immersion tank 28, and finally emerge from the immersion tank 28 at about another 45° angle. Thus, the wickets 24 and boards 1 are successively rotated about a moving axis taken in the plane of bars 23, i.e. an axis parallel to the innermost edge of the boards 1, said axis being itself rotated around sprocket wheels 20. The overall result of such rotation will be a total immersion of the boards 1 in the wax composition bath 29, and a travel of the boards 1 through a 180° angle from the lower flight 17b of conveyor 16, through the vertical position in the immersion tank 28, and thence to the upper flight 17a of conveyor 16. With the wickets 24 illustrated in FIGURES 5 and 6, very little resistance to travel in the bath 29 is induced due to their low surface areas and low speed.

FIGURE 6 illustrates a particularly preferred form of wicket which is composed of one piece of flattened expanded metal mesh material in the shape of a tapered corrugated sheet. The mesh structure increases the exposure of the fiberboards to the molten wax composition and to the heated air, as well as reducing the surface area in order to provide for economy of heat consumption.

The previously-described rotation of the boards 1, through the vertical position and thence around sprocket wheels 20, facilitates the initiation of the draining and heating periods with a minimum of expended time and space. Thus, as the boards 1 emerge from the immersion tank 28, and are carried into the inclined portion 16a of conveyor 16, by rotation around sprocket wheels 20, they are inverted at an angle with the horizontal to induce the draining of excess wax and are simultaneously subjected to the high temperature air being recirculated by blowers 31 and 32 as hereinbefore described.

At rollers 30, the boards 1 are again rotated, to an inverted vertical position; that is, a position 180° from the vertical position in the immersion tank 28, with the heating of the boards being continued during the stagewise rotation to said inverted vertical position. The high temperature (e.g. 250 to 270° F.) prevents the molten wax composition 29 from solidifying on the boards, and the gradual rotation and inversion of the boards 1 causes it to be evenly distributed throughout the boards 1. Thus, an important feature of the invention is achieved by the rotation and angular positioning of the boards 1 at various stages while they are being drained of excess wax composition 29 and are maintained at a temperature above its melting point. The excess wax composition 29 drains down through the flutes 1a of the boards 1, is evenly distributed, and finally drips down either directly to the immersion tank 28, or to the drip tray 39. Between rollers 30 and 30a, the boards 1 are maintained in their inverted position as the heating and draining proceeds. The boards are prevented from dropping from between the wickets 24 by the supporting action of ears 23a as previously described. Any excess wax composition which may drip onto the conveyor chains 18 serves as an excellent lubricant since it cannot solidify due to the high surrounding temperature. Drip tray 39 returns the unused wax composition to the immersion tank 28. During this part of the travel, that is, between rollers 30 and 30a, the fiberboards 1, under the influence of the heat and the molten wax composition, become thoroughly permeated with the wax composition throughout their interior and exterior fiber structure. At rollers 30a, the boards 1 are again rotated to their original vertical position. By this additional rotation, any excess wax composition which may have accumulated within the flutes at one edge of the board, now flows in the opposite direction and is again evenly distributed.

The net result of the aforementioned procedures is a 360° rotation of the boards measured from the original vertical position of the boards in the immersion tank 28. This rotation, which is performed in the above-described stages, ensures an even distribution of the wax composition within the flutes of each board and thereby eliminates excess accumulation of wax composition at the bottom of the board, which accumulation is commonly experienced in conventional vertical batchwise dipping procedures. Additionally, such rotation is performed under the influence of applied heating which prevents solidification of the wax composition and promotes a maximum penetration of the wax composition deep into the fibrous structure of the boards. As a result, a fully impregnated fiberboard of excellent quality and appearance is produced, using a minimum of wax composition.

After the boards 1 are rotated around rollers 30a, they approach the outlet opening 40, in enclosure 12a. As indicated, the impregnated boards 1, drop by gravity through opening 40, and are directed by guide member 41, onto outlet conveyor belt 42, where they are transported through the external cooling zone designated generally at 44, where cooling is accomplished in the manner hereinbefore described. The boards are finally deposited at the unloading station 48, from which they may be transported to storage.

Particular attention should be directed to the fact that the cooling of the boards is performed externally; that is, the cooling zones are independent from the heating zones. By such arrangement, no unnecessary heat is expended, as would be the case if the wickets were alternately heated and cooled in the same unit.

In general, the present invention is adaptable for use with any conventional wax composition. Specifically, however, certain improved wax compositions have recently been discovered that are especially suitable for the impregnation of corrugated fiberboards, which compositions have been found to provide higher wet strength and antirupture properties than conventional wax blends. While these compositions are not intended to be a subject of the present invention, they will be briefly described for purposes of completeness.

One particularly useful wax composition, designated composition A, will comprise (1) at least 60 wt. percent, e.g. 75 wt. percent of crystalline refined, substantially oil-free paraffin wax having a melting point of about 120 to 160° F., e.g. 130 to 155° F.; (2) up to 30 wt. percent, e.g. about 5 to 15 wt. percent, of a microcrystalline wax having a melting point above 160° F.; (3) up to 8 wt. percent, e.g. 1 to 4 wt. percent, of a polyolefin, e.g. polyethylene having a molecular weight in the range of 1500 to 25,000; and (4) about 1 to 25 wt. percent, e.g. 5 to 10 wt. percent of a solid polymer resin having a softening point of at least 158° F., e.g. 207 to 218° F., and a molecular weight of about 1000 to 1200, said resin being selected from the group consisting of petroleum polymer resins and styrene polymer resins.

Another useful composition, designated composition B, will comprise the same ingredients as the above composition with the exclusion of the polyolefin. Thus, a typical composition will comprise at least 40 wt. percent of the paraffin wax, up to 30 wt. percent of the microcrystalline wax, and about 10 to 30 wt. percent of the solid petroleum polymer or styrene polymer resin.

In conjunction with the use of the above wax compositions, certain operating conditions have been found to be particularly useful, if not critical, to the formation of a high quality impregnated fiberboard. Thus, for example, the temperature of the molten wax should preferably be in the range of 160 to 230° F., and temperatures as high as 240° F. should be carefully avoided as they tend to weaken the fibers and to darken the board. Similarly, the heat curing oven temperature should be maintained at such a value that the actual board temperature is no higher than about 230° F. The allowable oven temperatures will, of course, depend on a number of factors such as oven size, air rate, speed of conveyor, etc., and can readily be determined by experimentation during the actual operation of the apparatus.

Usually, the oven temperature will be slightly higher than the wax composition bath temperature due to the temperature gradient between the oven temperature and the board temperature. Since the recirculating heated air is continually in contact with the wax composition bath, there will thus be a tendency for the temperature of the bath and the oven to equalize. However, this tendency is overcome by the continuous introduction of the untreated boards into the bath. A heat balance is thereby created with the excess heat from the oven (i.e. that heat corresponding to the temperature gradient between the oven and the bath) being utilized to heat the incoming boards. Thus, in effect, the incoming boards serve to cool the wax bath and enable the latter to be maintained at a temperature below the temperature of the oven. Any upset in this heat balance due to varying board size or environmental temperatures can be readily compensated by the utilization of conventional cooling means for the wax composition bath.

While the above conditions and limitations have been found to be especially applicable to the wax impregnation of corrugated fiberboards with certain prescribed wax compositions, it is to be understood that the present invention is not intended to be so limited. As has been indicated, the apparatus is equally applicable to the coating and/or impregnation of flat sheet-like articles other than corrugated fiberboards. While certain unique features of the invention are especially suitable for corrugated fiberboards wherein a deep wax impregnation is required, the general features of the invention, e.g. continuous operation, drainage facility, economy of heat and space, etc., will be useful and valuable features for any dipping, coating or impregnating operation. The operating conditions, e.g. liquid composition, liquid temperature, oven temperature, conveyor speed, etc., may all be easily varied to suit the intended application.

As an example of the invention, the process and apparatus hereinbefore described are utilized to impregnate corrugated fiberboards with wax composition as follows:

Corrugated fiberboards of dimensions 60 in. x 48 in. x 0.5 in. are passed at a rate of 60 boards per minute through a bath of molten wax composition A, said bath being maintained at a temperature of 180 to 215° F. The boards are subsequently drained and heat-cured at an oven temperature of 250 to 270° F. and subsequently cooled. The retention time in the molten wax bath is about 15 seconds per board and in the heat-curing oven is about 5 minutes per board.

In sum, the present invention is adaptable to the coating or impregnation of any flat sheet-like article with a desired liquid material under variable predetermined conditions.

What is claimed is:

1. Apparatus for coating and impregnating fibrous paperboard articles and the like which comprises, in combination, an elongated housing including a bath for impregnating and coating material, an endless conveyor within said housing including a series of individual article holding means attached to successive elements of the conveyor so as to hold the articles in positions more or less normal to said elements, guide means for causing the conveyor to pass from a lower run to an inclined run for submerging the articles in the bath, thereafter into an upper run and then into said lower run, the arrangement being such that each article is submerged in approximately vertical position in the bath, is thereafter rotated about a substantially horizontal axis through substantially 180° for drainage along said upper run, and is finally rotated again through another substantially 180° for drainage along the lower run, and means for applying heat to the articles during said upper and lower runs.

2. Combination according to claim 1 which includes means for withdrawing the treated articles from the lower run and cooling them.

3. Combination according to claim 1 which includes means on the inclined run for feeding articles into the holding means.

4. A method of impregnating corrugated fiberboards which comprises immersing said boards in a molten bath of wax impregnating material in such a position that the corrugation flutes are substantially vertical, rotating the boards after immersion about a substantially horizontally axis through an angle of about 180° while applying heat for a suitable time period to facilitate impregnation and drainage of excess composition, then further rotating said boards about a substantially horizontal axis through an angle of aboutt 180° and applying heat for a further time period to facilitate further drainage, whereby substantially uniform coating and impregnation inside the flutes is achieved.

5. Method according to claim 4 wherein the articles are carried continuously through the successive impregnating and drainage operations.

6. Method according to claim 4 wherein the articles are promptly cooled after the further drainage step.

References Cited by the Examiner
UNITED STATES PATENTS

| | | | |
|---|---|---|---|
| 371,990 | 10/1887 | Stone | 117—95 X |
| 737,361 | 8/1903 | Daniels | 118—64 |
| 1,042,914 | 10/1912 | Heyl | 118—426 |
| 2,355,278 | 8/1944 | Davis | 118—426 |
| 2,430,641 | 11/1947 | MacKenzie et al. | 118—423 X |
| 2,530,026 | 11/1950 | Muench | 118—423 X |
| 2,722,197 | 11/1955 | Robert | 118—69 X |
| 2,723,923 | 11/1955 | Munters | 117—113 X |
| 2,785,610 | 3/1957 | Meyer-Jagenberg et al. | 118—423 X |
| 2,967,116 | 1/1961 | Hollinger et al. | 117—158 X |
| 3,011,914 | 12/1961 | Pflug | 118—64 X |

RICHARD D. NEVIUS, *Primary Examiner.*

WILLIAM D. MARTIN, *Examiner.*